(12) United States Patent
Seong

(10) Patent No.: US 9,812,673 B2
(45) Date of Patent: Nov. 7, 2017

(54) BATTERY PACK

(71) Applicant: SAMSUNG SDI CO., LTD., Yongin-si, Gyeonggi-do (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 212 days.

(21) Appl. No.: 14/294,027

(22) Filed: Jun. 2, 2014

(65) Prior Publication Data

US 2015/0207109 A1    Jul. 23, 2015

(30) Foreign Application Priority Data

Jan. 20, 2014   (KR) ........................ 10-2014-0006740

(51) Int. Cl.
*H01M 2/02* (2006.01)
*H01M 2/04* (2006.01)

(52) U.S. Cl.
CPC ....... *H01M 2/0202* (2013.01); *H01M 2/0404* (2013.01); *H01M 2002/0205* (2013.01); *H01M 2220/30* (2013.01)

(58) Field of Classification Search
CPC ....... H01M 2002/0205; H01M 2/0207; H01M 2/0212; H01M 2/0215; H01M 2/1066; H01M 2/10
See application file for complete search history.

(56) References Cited

U.S. PATENT DOCUMENTS

| 5,198,313 A | 3/1993 | Juergens |
| 6,020,086 A | 2/2000 | Van Lerberghe |
| 2003/0017390 A1 | 1/2003 | Probst et al. |
| 2005/0130030 A1 | 6/2005 | Watanabe et al. |
| 2006/0040178 A1 | 2/2006 | Probst et al. |
| 2008/0003498 A1* | 1/2008 | Yasuda ............... H01G 9/08 429/177 |
| 2011/0014516 A1 | 1/2011 | Roh et al. |
| 2011/0097615 A1 | 4/2011 | Goh et al. |
| 2012/0183825 A1 | 7/2012 | Lee et al. |

(Continued)

FOREIGN PATENT DOCUMENTS

| JP | 2002-245975 | 8/2002 |
| KR | 1999-0022813 A | 3/1999 |

(Continued)

OTHER PUBLICATIONS

U.S. Office action dated Feb. 22, 2016, for cross reference U.S. Appl. No. 14/606,145, (17 pages).

(Continued)

*Primary Examiner* — Nicholas P D'Aniello
*Assistant Examiner* — Abibatu Ojo-Amoo
(74) *Attorney, Agent, or Firm* — Lewis Roca Rothgerber Christie LLP

(57) ABSTRACT

A battery pack includes a case including a first main wall, a second main wall facing the first main wall, and an uneven portion formed in at least one of the first main wall and the second main wall; and an electrode assembly received in an internal space of the case. The uneven portion may include a plurality of first uneven portions formed in a central portion of the first main wall, and a plurality of second uneven portions formed in a central portion of the second main wall.

18 Claims, 3 Drawing Sheets

(56) References Cited

U.S. PATENT DOCUMENTS

2015/0303410 A1* 10/2015 Seong ................ H01M 2/0202
429/163
2015/0303411 A1* 10/2015 Seong ................ H01M 2/0202
429/163

FOREIGN PATENT DOCUMENTS

| KR | 10-2009-0097731 | 9/2009 |
| KR | 10-2010-0025968 | 3/2010 |
| KR | 10-2011-0006524 | 1/2011 |
| KR | 2012-0082808 A | 7/2012 |
| WO | WO 97/38453 A1 | 10/1997 |

OTHER PUBLICATIONS

U.S. Office action dated Mar. 11, 2016, for cross reference U.S. Appl. No. 14/605,172, (13 pages).
Patent Abstracts of Japan and English machine translation of Japanese Publication 2002-245975 dated Aug. 30, 2002, listed above, (18 pages).

* cited by examiner

BATTERY PACK

CROSS-REFERENCE TO RELATED APPLICATION

This application claims priority to and the benefit of Korean Patent Application No. 10-2014-0006740, filed on Jan. 20, 2014 in the Korean Intellectual Property Office, the entire content of which is incorporated herein by reference.

BACKGROUND

1. Field

Aspects of embodiments of the present invention relate to battery packs.

2. Description of the Related Art

Markets for various electronic appliances, such as mobile phones, game consoles, portable multimedia players (PMP), mpeg audio layer-3 (MP3) players, smartphones, smart pads, electronic book terminals, flexible tablet computers, and wearable medical equipment have remarkably grown due to the technological developments in wireless Internet and other communication technologies.

Among these devices, mobile computers are compact and easy to carry and, thus, are widely used for work or personal purposes at fixed locations or when traveling. To this end, mobile computers may include a battery pack as a power supply device. A battery pack may include a plurality of unit batteries that may be repeatedly charged and discharged in order to provide sufficient power output.

As the market for mobile electronic appliances is expanding, various types of mobile electronic appliances are provided according to users' needs. Thus, requirements for battery packs suitable for the many types of mobile electronic appliances have also increased. In particular, as users have become interested in curved mobile electronic appliances, demand for curved battery packs has increased.

SUMMARY

According to an aspect of one or more embodiments of the present invention, a battery pack has a curved shape and is stable.

Additional aspects of embodiments of the present invention are set forth, in part, in the description which follows and, in part, will be apparent from the description, or may be learned by practice of the described embodiments.

According to one or more embodiments of the present invention, a battery pack includes: a case including a first main wall, a second main wall facing the first main wall, and an uneven portion formed in at least one of the first main wall and the second main wall; and an electrode assembly received in an internal space of the case.

The uneven portion may include: a plurality of first uneven portions formed in a central portion of the first main wall; and a plurality of second uneven portions formed in a central portion of the second main wall.

The plurality of first uneven portions may be symmetrically formed with respect to the central portion of the first main wall, and the plurality of second uneven portions may be symmetrically formed with respect to the central portion of the second main wall.

The plurality of first uneven portions may be formed by pressing the first main wall, and the plurality of second uneven portions may be formed by pressing the second main wall.

The plurality of first uneven portions may be formed by pressing the first main wall from an inside of the case toward an outside of the case, and the plurality of second uneven portions may be formed by pressing the second main wall from the inside toward the outside.

The first main wall may be curved, and a gap between first uneven portions of the plurality of first uneven portions may be reduced in the curved state of the first main wall.

The second main wall may be curved, and a thickness of second uneven portions of the plurality of second uneven portions may be reduced and the second main wall may be expanded in the curved state of the second main wall.

The uneven portion may be formed in a length direction of the case.

The uneven portion may be formed in a width direction of the case.

The uneven portion may be elastic, and the first main wall and the second main wall may have a curvature.

A curvature radius of the second main wall may be greater than a curvature radius of the first main wall.

A difference between the curvature radius of the second main wall and the curvature radius of the first main wall may be about 10 mm to about 30 mm.

The curvature radius of the second main wall may be about 200 mm or greater.

The electrode assembly may be curved along the first main wall and the second main wall by pressing the first main wall and the second main wall.

The electrode assembly may be curved along the first main wall and the second main wall and inserted into the case.

The battery pack may further include a cap plate sealing an opening of the case to protect the electrode assembly.

The battery pack may further include an electrode pin arranged at a top surface portion of the cap plate and electrically connected to the electrode assembly.

The electrode pin may have a first polarity, and the cap plate may have a second polarity that is different from the first polarity.

A first side of the cap plate may have a same curvature radius as the first main wall, and a second side of the cap plate may have a same curvature radius as the second main wall.

A curvature may be formed in each of the first side and the second side of the cap plate by pressing the first main wall and the second main wall.

BRIEF DESCRIPTION OF THE DRAWINGS

These and/or other aspects and features of the present invention will become apparent and more readily appreciated from the following description of some exemplary embodiments, taken in conjunction with the accompanying drawings in which.

DETAILED DESCRIPTION

Figure 1:
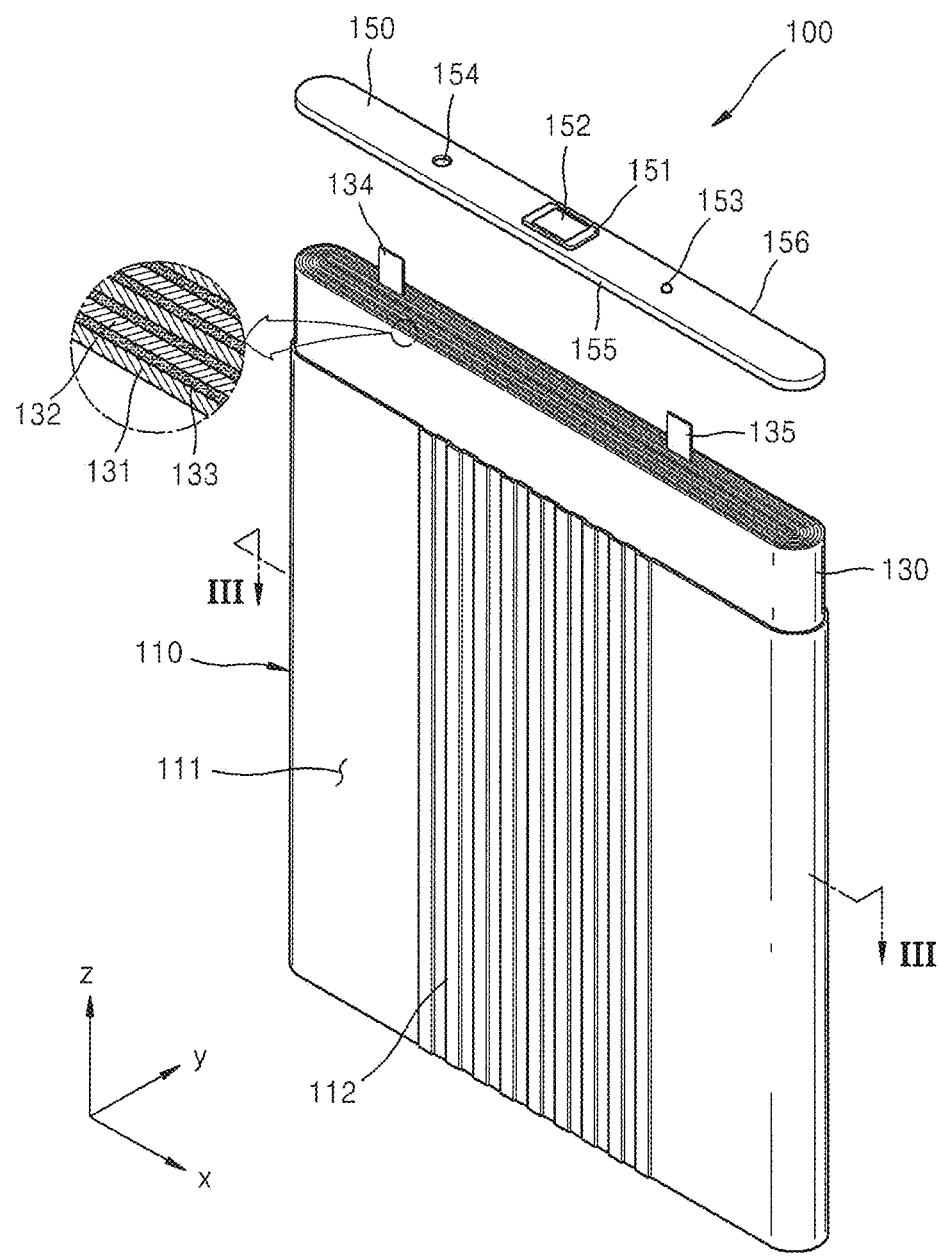
FIG. 1 is a schematic exploded perspective view of a battery pack according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Expressions such as "at least one of," when preceding a list of elements, modify the entire list of elements and do not modify the individual elements of the list, unless specified otherwise. Like reference numerals refer to like elements throughout.

Since the present invention may have various modifications and embodiments, some exemplary embodiments are shown in the drawings and will be described in further detail. Aspects, features, and methods of achieving the same will be specified with reference to the embodiments described below in further detail together with the attached drawings. However, embodiments of the present invention may have different forms and should not be construed as being limited to the descriptions set forth herein.

Some embodiments of the present invention are described below in further detail with reference to the accompanying drawings. Those components that are the same are described using the same reference numeral throughout the drawings, and redundant descriptions thereof may not be repeated.

It is to be understood that although the terms "first," "second," etc. may be used herein to describe various components, these components are not limited by these terms. Rather, these terms are used merely to distinguish one component from another.

Singular expressions, unless defined otherwise, may include plural expressions.

In the embodiments described below, it is to be understood that the terms "comprise" and/or "have" as used herein specify the presence of stated features or components, but do not preclude the presence or addition of one or more other features or components.

It is also to be understood that when an element such as a layer, an area, or a component is referred to as being "on" or "on the top of" another element, it may be directly on or directly on the top of the other element, or intervening layers, areas, or components may also be present.

In the embodiments described below, an x-axis, a y-axis, and a z-axis are not limited to three axes on a rectangular coordinates system but may be construed as including these axes. For example, an x-axis, a y-axis, and a z-axis may be at right angles or may also indicate different directions from one another, which are not at right angles.

Also, in the drawings, for purposes of clarity and convenience of description, sizes of elements may be exaggerated or contracted. That is, while sizes and thicknesses of components in the drawings may be arbitrarily illustrated for purposes of clarity and convenience of description, embodiments of the present invention are not limited thereto.

Figure 2:
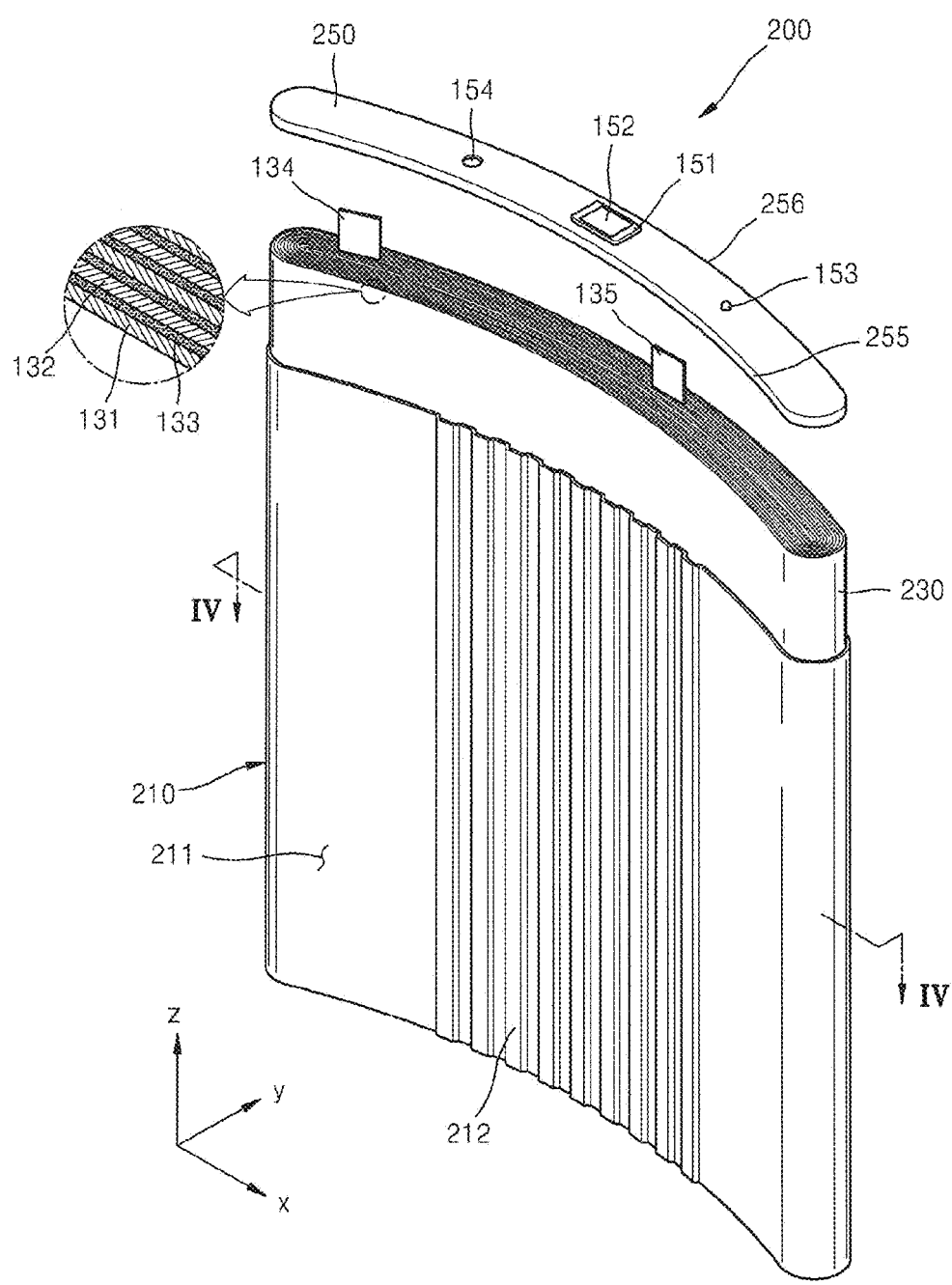
FIG. 2 is an exploded perspective view illustrating a battery pack, according to an embodiment of the present invention, formed by pressure-deforming the battery pack of FIG. 1.
Figure 3:
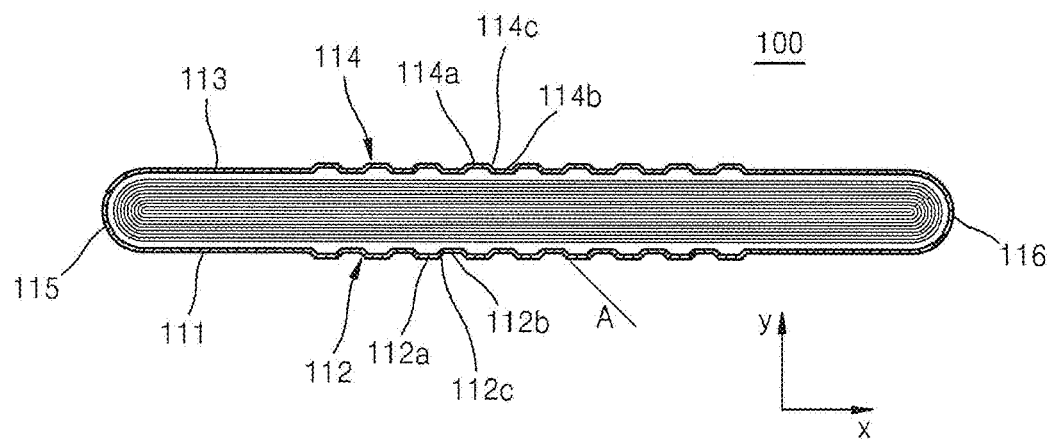
FIG. 3 is a cross-sectional view of the battery pack of FIG. 1, taken through the line III-III.
Figure 4:
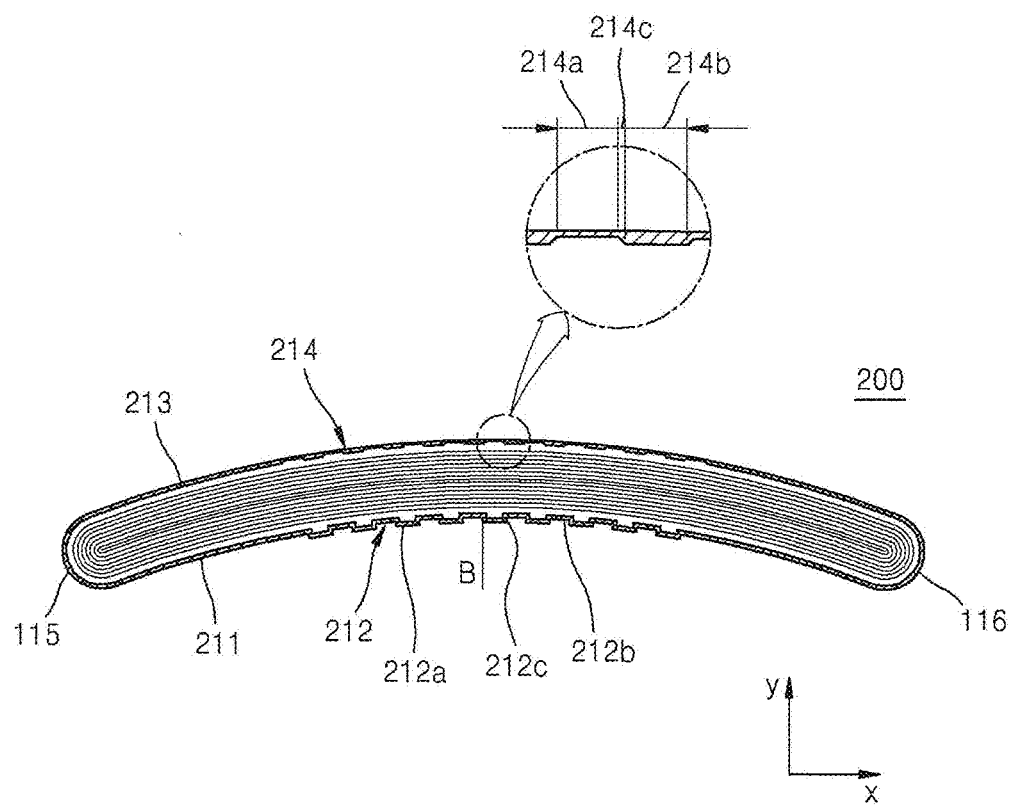
FIG. 4 is a cross-sectional view of the battery pack of FIG. 2, taken through the line IV-IV.

FIG. 1 is a schematic exploded perspective view of a battery pack 100 according to an embodiment of the present invention. FIG. 2 is an exploded perspective view illustrating a battery pack 200, according to an embodiment of the present invention, formed by pressure-deforming the battery pack 100. FIG. 3 is a cross-sectional view of the battery pack 100, taken through the line of FIG. 1. FIG. 4 is a cross-sectional view of the battery pack 200, taken through the line IV-IV of FIG. 2. The battery pack 100 is described first below, followed by a description of the battery pack 200.

Referring to FIGS. 1 and 3, the battery pack 100 according to an embodiment of the present invention includes a case 110, an electrode assembly 130, a cap plate 150, and uneven portions which include a plurality of first uneven portions 112 and a plurality of second uneven portions 114. The battery pack 100 may be a rechargeable secondary battery such as a lithium-ion battery.

The case 110, in one embodiment, includes a first main wall 111, a second main wall 113 facing the first main wall 111, a first connection wall 115 connecting a first end of the first main wall 111 and a first end of the second main wall 113, and a second connection wall 116 connecting a second end of the first main wall 111 and a second end of the second main wall 113. An opening and an internal space surrounded by the first main wall 111, the second main wall 113, the first connection wall 115, and the second connection wall 116 are formed in the case 110. The electrode assembly 130 is inserted through the opening to install the electrode assembly 130 in the case 110.

The case 110, in one embodiment, may have an approximately hexahedral shape with an open top surface, and may be formed of a metal or metallic material to provide rigidity to the case 110. In one embodiment, for example, the case 110 may be formed of aluminum or an aluminum alloy. After the electrode assembly 130 is inserted into the case 110 through the opening, the opening may be covered or encapsulated by the cap plate 150. The cap plate 150, in one embodiment, may also be formed of aluminum or a metal or metallic material such as an aluminum alloy. The cap plate 150 and the case 110 may be coupled to each other, such as by laser welding, thereby tightly sealing the case 110.

The uneven portions 112 and 114 may be formed on at least one of the first main wall 111 and the second main wall 113. In one embodiment, the uneven portions 112 and 114 include the plurality of first uneven portions 112 formed in a central portion of the first main wall 111 and/or the plurality of second uneven portions 114 formed in a central portion of the second main wall 113.

The plurality of first uneven portions 112 and the plurality of second uneven portions 114 may be formed along a lengthwise direction (e.g., a Z-axis) of the case 110 or along a widthwise direction (e.g., an X-axis) of the case 110. A method in which the plurality of first uneven portions 112 and the plurality of second uneven portions 114 are formed in the widthwise direction (e.g., the X-axis) of the case 110 is the same or similar as a method in which the plurality of first uneven portions 112 and the plurality of second uneven portions 114 are formed in the lengthwise direction (e.g., the Z-axis) of the case 110, and thus, the following description will focus on an embodiment in which the plurality of first uneven portions 112 and the plurality of second uneven portions 114 are formed in the lengthwise direction (e.g. the Z-axis) of the case 110.

In one embodiment, the plurality of first uneven portions 112 is symmetrically formed with respect to a central portion of the first main wall 111.

In one embodiment, the plurality of first uneven portions 112 may include a first convex portion 112a, a first concave portion 112b, and a first connection portion 112c that are continuously formed. The first convex portion 112a and the first concave portion 112b may be alternately connected via the first connection portion 112c.

The plurality of first uneven portions 112 may be formed by applying a pressure to the first main wall 111. Accordingly, a shape of the plurality of first uneven portions 112 may vary according to a shape of a pressing unit (not shown) of a pressing instrument (not shown). For example, the plurality of first uneven portions 112 may be curved and round or may be polygonal. However, for convenience of description, it is illustrated and described below that the first uneven portions 112 have continuous polygonal or rectangular shapes.

The first main wall 111 may be pressed from an inside to an outside such that the first convex portion 112a of the plurality of first uneven portions 112 is directed outwardly. That is, by pressing the first main wall 111, the first connection portion 112c extends such that the first convex portion 112a is directed toward the outside of the case 110. Also, in the same manner of pressing the first main wall 111, but varying a pressing direction by pressing the first main wall 111 from the outside to the inside, the first connection portion 112c extends such that the first concave portion 112b is directed toward the inside of the case 110.

In one embodiment, the plurality of second uneven portions 114 is formed symmetrically with respect to a central portion of the second main wall 113.

The plurality of second uneven portion 114 may be formed in a similar manner as the plurality of first uneven portions 112. In one embodiment, the plurality of second uneven portions 114 may include a second convex portion 114a, a second concave portion 114b, and a second connection portion 114c that are continuously formed. The second convex portion 114a and the second concave portion 114b are alternately connected to each other via the second connection portion 114c. The shape of the plurality of second uneven portions 114 and the method of forming the plurality of second uneven portions 114 may be the same or similar as the shape of the plurality of first uneven portions 112 and the method of forming the plurality of first uneven portions 112, and, thus, further description thereof will be omitted.

The electrode assembly 130 may include a first electrode layer 131, a second electrode layer 132, and a separator 133 disposed between the first electrode layer 131 and the second electrode layer 132. The electrode assembly 130 may have a structure in which a plurality of first electrode layers 131, a plurality of second electrode layers 132, and a plurality of separators 133 are stacked. In one embodiment, the electrode assembly 130 may have a jelly roll structure in which the first electrode layer 131, the second electrode layer 132, and the separator 133 are wound around one another. While, for convenience of description, it is described below that the electrode assembly 130 has a jelly roll structure in which the first electrode layer 131, the second electrode layer 132, and the separator 133 are wound around one another, embodiments of the present invention are not limited thereto.

The first electrode layer 131 may be one of a positive electrode film and a negative electrode film. If the first electrode layer 131 is a positive electrode film, the second electrode layer 132 may be a negative electrode film; on the other hand, if the first electrode layer 131 is a negative electrode film, the second electrode layer 132 may be a positive electrode film. That is, the first electrode layer 131 and the second electrode 132 have different electrical polarities and are not limited to a particular polarity. However, for convenience of description, it is described below that the first electrode layer 131 is formed of a positive electrode film and the second electrode layer 132 is formed of a negative electrode film.

The first electrode layer 131 may include a first metal collector (not shown) and a first active material portion (not shown) formed of a first active material (not shown) coated on a surface of the first metal collector. Likewise, the second electrode layer 132 may include a second metal collector (not shown) and a second active material portion (not shown) formed of a second active material (not shown) coated on a surface of the second metal collector.

In one embodiment, the first electrode layer 131 may be a positive electrode film, the first metal collector may be a positive electrode collector, and the first active material portion may be a positive electrode active material portion. In one embodiment, the second electrode layer 132 may be a negative electrode film, the second metal collector may be a negative electrode collector, and the second active material portion may be a negative active material portion. Each of the positive electrode collector, the positive electrode active material portion, the negative electrode collector, and the negative electrode active material portion may be formed of a material and in a manner that is known in the art, and, thus, a detailed description of the materials and structures thereof is omitted.

The separator 133 may be a porous polymer layer, such as a polyethylene layer or a polypropylene layer, or may be a woven or nonwoven fiber including a polymer fiber, may include ceramic particles, and may be formed of a polymer solid electrolyte. The separator 133 may be formed of an independent film or by forming a nonconductive porous layer on the first electrode layer 131 or the second electrode layer 132.

The separator 133 electrically insulates the first electrode layer 131 and the second electrode layer 132 from each other, and the shape of the separator 133 may not necessarily be the same as the shape of the first electrode layer 131 or the second electrode layer 132.

A first electrode plate 134 may have a different polarity from that of a second electrode plate 135. The first electrode plate 134 and the second plate 135 are installed to electrically connect the electrode assembly 130 to the outside. In one embodiment, the first electrode plate 134 is electrically connected to the first electrode layer 131 to have a positive polarity, and the second electrode plate 135 is electrically connected to the second electrode layer 132 to have a negative polarity.

The cap plate 150 seals the opening of the case 110 to protect the electrode assembly 130 installed inside the case 110. The shape of the cap plate 150 may be the same as the shape of the opening of the case 110. Accordingly, the cap plate 150 may have a first side surface 155 that is coupled to the case 110 to contact the first main wall 111 and a second side surface 156 that is coupled to the case 110 to contact the second main wall 113.

An electrode pin 152 may be disposed on the cap plate 150. In one embodiment, the first electrode plate 134 may be electrically connected to the cap plate 150, and the second electrode plate 135 may be electrically connected to the electrode pin 152. The first electrode plate 134 and the second electrode plate 135 have different polarities from each other, and the cap plate 150 and the electrode pin 152 that are connected to the first electrode plate 134 and the second electrode plate 135, respectively, also have different polarities. In one embodiment, for example, the cap plate 150 may have a positive polarity, and the electrode pin 152 may have a negative polarity. To prevent or substantially prevent a short circuit between the electrode pin 152 and the cap plate 150, a gasket 151 may be arranged between the electrode pin 152 and the cap plate 150. The gasket 151 may be formed of an insulating material.

An electrolyte solution inlet 154 through which an electrolyte solution is injected into the case 110 may be formed in the cap plate 150, and after the electrolyte solution is injected, the electrolyte solution inlet 154 may be sealed, such as by using a sealing stopper (not shown).

In one embodiment, an insulation case (not shown), a terminal plate (not shown), and an insulation plate (not shown) may be included between the cap plate 150 and the electrode assembly 130. The insulation case is mounted inside the opening of the case 110 accommodating the electrode assembly 130. The terminal plate is mounted on a surface of the insulation case and is formed of a conductive material to form an electrical path between the electrode pin 152 and the second electrode plate 135. The insulation plate insulates an external surface of the terminal plate so as to prevent or substantially prevent an electrical short circuit between the terminal plate and the cap plate 150.

The cap plate 150 may include an anchor unit 153 to fix the insulation plate and the terminal plate. The anchor unit 153 may fix positions of the insulation plate and the terminal plate to prevent or substantially prevent an electrical short circuit.

Referring to FIGS. 2 and 4, the battery pack 200 according to an embodiment of the present invention may include a case 210, an electrode assembly 230, a cap plate 250, and uneven portions which include a plurality of first uneven portions 212 and a plurality of second uneven portions 214 In one embodiment, the battery pack 200 is obtained by applying a pressure to curve the battery pack 100, and the battery pack 200 is the same or substantially the same as the battery pack 100 except for the form of the plurality of first uneven portions 212 and the plurality of second uneven portions 214, which is obtained by applying a pressure to the case 110. Also, the battery pack 200 has a different external shape from the battery pack 100. Thus, the description below focuses on the plurality of first uneven portions 212 and the plurality of second uneven portions 214 and the cap plate 250 which respectively have a different external form than the plurality of first uneven portions 112 and the plurality of second uneven portions 114 and the cap plate 150.

A first main wall 211 and a second main wall 213 of the case 210 of the battery pack 200 are curved to have a curvature (e.g., a predetermined curvature) due to elasticity of the plurality of first uneven portions 212 and the plurality of second uneven portions 214. The battery pack 100 illustrated in FIG. 3, which is in a state before deformation, and the battery pack 200 illustrated in FIG. 4, which is in a state after deformation, are described further below.

In the plurality of first uneven portions 212, a gap between first convex portions 212a is reduced and a gap between first concave portions 212b is reduced such that a curvature of the first main wall 211 is formed.

In the plurality of first uneven portions 212, as the gap between the first convex portions 212a and the gap between the first concave portions 212b are reduced, a length of an arc of the first main wall 211 is reduced.

Before the battery pack 100 is deformed, the first connection portion 112c connects the first convex portion 112a and the first concave portion 112b at a first inclination angle "A" (e.g., a predetermined inclination angle) with respect to the first main wall 111. After the battery pack 100 is deformed to form the battery pack 200, the first main wall 211 receives a lateral pressure, and, thus, the first connection portion 212c has a second inclination "B" greater than the first inclination angle "A."

The first connection portion 212c may connect the first convex portion 212a and the first concave portion 212b in a vertical or approximately vertical manner, or may allow a portion of the first convex portion 212a and a portion of the first concave portion 212b to overlap.

Accordingly, as an inclination of the first connection portion 212c is varied, the gap between the first convex portions 212a is reduced, and the gap between the concave portions 212b is reduced such that the first main wall 211 may have a curvature (e.g., a predetermined curvature). Also, as the first main wall 211 has a curvature (e.g., a predetermined curvature), a length of the arc of the first main wall 211 may be reduced as much as a reduced portion of the gap.

A length of an arc of the second main wall 213 having the plurality of second uneven portions 214 is increased as thicknesses of a second convex portion 214a, a second concave portion 214b, and a second connection portion 214c are reduced, and the second main wall 213 has a curvature (e.g., a predetermined curvature).

Before the battery pack 100 is deformed, the plurality of second uneven portions 114 include the second convex portion 114a, the plurality of second concave portions 114b, and the second connection portion 114c that may be formed by applying a pressure thereto, and the second connection portion 114c connects the second convex portion 114a and the second concave portion 114b at an inclination (e.g., a predetermined inclination). In one embodiment, the thicknesses of the second convex portion 114a, the second concave portion 114b, and the second connection portion 114c are reduced compared to a thickness of the second main wall 113 which is not pressed. In one embodiment, the second convex portion 114a is formed to face outwardly by pressing the second main wall 113 from the inside to the outside, and the thickness of the second convex portion 114a may be further reduced.

When the battery pack 200 is formed, the second connection portion 214c receives a lateral tension so as to substantially flatly connect the second concave portion 214b and the second convex portion 214a. A length of the arc of the second main wall 113 increases corresponding to the reduced thickness of the plurality of second uneven portions 214 during molding of the second plurality of uneven portions 214.

The gap of the first concave portion 212b is reduced such that the length of the first main wall 211 is reduced, and the length of the second main wall 213 is increased corresponding to the reduced thickness of the plurality of second uneven portions 214. Consequently, a curvature radius of the second main wall 213 is greater than a curvature radius of the first main wall 211.

The curvature radius of each of the first main wall 211 and the second main wall 213 is not limited to a predetermined curvature but may be determined according to a user's requirement. For example, if the second main wall 213 has a curvature radius of 200 mm or greater, an electronic device (not shown) including the battery pack 200 may provide a user with increased convenience. In addition, if a difference between a curvature radius of the second main wall 213 and a curvature radius of the first main wall 211 is 10 mm to 30 mm, the battery pack 200 may have a slim structure.

As each of the first main wall 211 and the second main wall 213 of the case 210 has a curvature (e.g., a predetermined curvature), the electrode assembly 230 installed in an internal space of the case 210 is curved along the first main wall 211 and the second main wall 213. The electrode assembly 230 may be installed in the internal space of the case 210 and may be concurrently (e.g., simultaneously) curved with the case 210, or the electrode assembly 230 and the case 210 may be individually or separately curved.

When the case 210 is curved, the cap plate 250 that seals the opening of the case 210 may also be curved along the first main wall 211 and the second main wall 213. In one embodiment, a first side 255 of the cap plate 250 that is connected to the first main wall 211 has the same curvature as the first main wall 211. Thus, the first side 255 is connected to the first main wall 211. A second side 256 of the cap plate 250 has the same curvature as the second main wall 213. Thus, the second side 256 is connected to the second main wall 213.

When the cap plate 250 is installed at the opening of the case 210, the cap plate 250 may be concurrently (e.g., simultaneously) curved with the case 210. That is, after installing the electrode assembly 230 in the internal space of the case 210, the case 210 may be sealed by the cap plate 250, such as by welding. Then, the first main wall 211 and the second main wall 213 may be pressed so as to concurrently (e.g., simultaneously) form a curvature in the first main wall 211, the second main wall 213, the electrode assembly 230, and each of the first side 255 and the second side 256 of the cap plate 250.

In another embodiment, the cap plate 250 and the case 210 may each be curved individually or separately, and the cap plate 250 may then be installed at the opening of the case 210 to seal the opening.

A battery pack is typically manufactured using a rigid material. Thus, when the battery pack is pressed to form a curvature (e.g., a predetermined curvature) therein, cracks may be formed in the battery pack due a limited flexibility thereof. Also, when the battery pack is pressed, a uniformly curved shape of the battery pack may not be maintained and a thickness of a portion of the battery pack may increase.

However, in the battery packs 100 and 200 according to embodiments of the present invention, the plurality of first uneven portions 112 and 212 are flexible, and a length of the arc of the first main wall 111 and 211 is reduced when the battery pack 100 is curved to form the battery pack 200, and, thus, expansion of the first main walls 111 and 211 in thickness may be minimized or reduced.

Also, when the battery pack 100 is curved to form the battery pack 200, due to the plurality of first uneven portions 112 and 212 that are flexible, a curvature of the battery packs 100 and 200 may be formed via a small force, and thus, energy consumption may be minimized or reduced.

Also, according to the battery packs 100 and 200, material deformation such as cracks in the cases 110 and 210 may be minimized or reduced when manufacturing the battery packs 100 and 200.

In addition, when manufacturing the battery packs 100 and 200 by forming the plurality of second uneven portions 114 and 214, a length of the arc of the second main walls 113 and 213 may be increased so as to form a curvature of the battery pack 200 by applying a small force to the battery pack 100, and, thus, energy consumption for the manufacture of the battery packs 100 and 200 may be minimized or reduced. In addition, by increasing a length of the arc of the second main wall 113, material deformation such as cracks in the case 110 and 220 may be minimized or reduced.

Due to overcharging, over-discharging, an internal short circuit, and/or an overheating condition of a battery pack, an internal temperature of a case that surrounds an external surface of the battery pack increases, and an internal gas pressure may be greatly increased. At this point, swelling of a case of a battery pack may generally occur.

However, according to embodiments of the present invention, the plurality of first uneven portions 112 and 212 and the plurality of second uneven portions 114 and 214 of the battery packs 100 and 200 are flexible, and, thus, increase of a gas pressure in the battery packs 100 and 200 may be reduced, thereby minimizing or reducing swelling of the case 110 and 210.

As a curvature of the battery pack 200 may be modified according to the form of an electronic device (not shown), space use of the inner area of the electronic device may be increased.

As described above, according to one or more embodiments of the present invention, the battery packs 100 and 200 may be curved by applying a bending force. Also, during bending, deformation of a material of the battery packs 100 and 200 may be minimized or reduced to thereby maintain the stability thereof.

The battery packs 100 and 200 according to embodiments of the present invention include a flexible uneven portion that reduces a pressure of an internal gas in the battery packs 100 and 200, thereby minimizing or reducing swelling of the cases 110 and 210.

It is to be understood that the exemplary embodiments described herein should be considered in a descriptive sense only and not for purposes of limitation. Descriptions of features or aspects within each embodiment should typically be considered as available for other similar features or aspects in other embodiments.

While the present invention has been described in connection with certain exemplary embodiments, it is to be understood that the invention is not limited to the disclosed embodiments. Accordingly, it will be understood by those of skill in the art that various changes in form and details may be made without departing from the spirit and scope of the present invention as set forth in the following claims and equivalents thereof.

What is claimed is:

1. A battery pack comprising:
a case comprising a first main wall, a second main wall facing the first main wall, and an uneven portion comprising a plurality of uneven portions formed in at least one of the first main wall and the second main wall, the plurality of uneven portions comprising a plurality of first uneven portions comprising a convex portion, a concave portion, and a connection portion that are continuously formed in the first main wall such that the convex portion and the concave portion are connected via the connection portion, the convex portion being outwardly convex such that a recess corresponding to the convex portion is formed at an inner surface of the first main wall, the concave portion being outwardly concave such that an embossing corresponding to the concave portion is formed at the inner surface of the first main wall;
an electrode assembly received in an internal space of the case; and
a cap plate sealing an opening at a first end of the case to protect the electrode assembly, the first end being spaced apart from a second end of the case in a longitudinal direction,
wherein the uneven portion is extended from the first end of the case to the second end of the case in the longitudinal direction,
wherein the plurality of first uneven portions further comprises another outwardly convex portion spaced apart from the convex portion in a direction transverse to the longitudinal direction, and
wherein the first main wall and the second main wall have a curvature, and a curvature radius of the second main wall is greater than a curvature radius of the first main wall.

2. The battery pack of claim 1, wherein the plurality of first uneven portions is formed in a central portion of the first main wall; and wherein the plurality of uneven portions further comprises a plurality of second uneven portions formed in a central portion of the second main wall.

3. The battery pack of claim 2, wherein the plurality of first uneven portions is symmetrically formed with respect to the central portion of the first main wall, and the plurality of second uneven portions is symmetrically formed with respect to the central portion of the second main wall.

4. The battery pack of claim 2, wherein the plurality of first uneven portions is formed by pressing the first main wall, and the plurality of second uneven portions is formed by pressing the second main wall.

5. The battery pack of claim 4, wherein the plurality of first uneven portions is formed by pressing the first main wall from an inside of the case toward an outside of the case, and the plurality of second uneven portions is formed by pressing the second main wall from the inside toward the outside.

6. The battery pack of claim 2, wherein the first main wall is curved, and a gap between first uneven portions of the plurality of first uneven portions is reduced in the curved state of the first main wall.

7. The battery pack of claim 2, wherein the second main wall is curved, and a thickness of second uneven portions of the plurality of second uneven portions is reduced and the second main wall is expanded in the curved state of the second main wall.

8. The battery pack of claim 1, wherein the uneven portion is formed in a length direction of the case.

9. The battery pack of claim 1, wherein the uneven portion is formed in a width direction of the case.

10. The battery pack of claim 1, wherein the uneven portion is elastic.

11. The battery pack of claim 1, wherein a difference between the curvature radius of the second main wall and the curvature radius of the first main wall is about 10 mm to about 30 mm.

12. The battery pack of claim 1, wherein the curvature radius of the second main wall is about 200 mm or greater.

13. The battery pack of claim 10, wherein the electrode assembly is curved along the first main wall and the second main wall by pressing the first main wall and the second main wall.

14. The battery pack of claim 10, wherein the electrode assembly is curved along the first main wall and the second main wall and is inserted into the case.

15. The battery pack of claim 1, further comprising an electrode pin arranged at a top surface portion of the cap plate and electrically connected to the electrode assembly.

16. The battery pack of claim 15, wherein the electrode pin has a first polarity, and the cap plate has a second polarity that is different from the first polarity.

17. The battery pack of claim 1, wherein a first side of the cap plate has a same curvature radius as the first main wall, and a second side of the cap plate has a same curvature radius as the second main wall.

18. The battery pack of claim 17, wherein a curvature is formed in each of the first side and the second side of the cap plate by pressing the first main wall and the second main wall.

* * * * *